Patented Feb. 27, 1940

2,192,085

UNITED STATES PATENT OFFICE 2,192,085

MANUFACTURE OF PYRIDINIUM COMPOUNDS

Valentin Kartaschoff and Willy Steinemann, Basel, Switzerland, assignors to the firm of Chemical Works formerly Sandoz, Basel, Switzerland No Drawing. Application October 21, 1938, Serial No. 236,332. In Germany October 21, 1937

8 Claims. (Cl. 260—296)

The present invention relates to the manufacture of new pyridinium compounds which are valuable assistants in the treatment of textile fibres dyed with water-soluble dyestuffs.

It has been found that new pyridinium compounds can be obtained by treating the compounds of the general formula

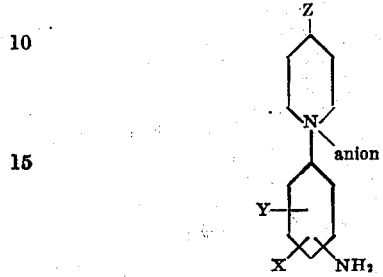

wherein X represents a hydrogen, a nitro, a halogen or an amino group, Y represents hydrogen or an amino, Z represents hydrogen, amino or halogen and "anion" stands for halogen, sulpho, hyaroxy or a radical of an organic acid, with aldehydes or alkylol ureae and, if desired, by treating the condensation products thus obtained with alkylating, aralkylating or acylating agents. If for the preparation of the new condensation products both groups of the above cited compounds are used, the treatment therewith may be carried out in any desirable order. Thus for instance it is possible first to alkylate or acylate the amino compounds of the above general formula and thereupon treat them with aldehydes or alkylol ureae in order to obtain the desired condensation products.

The compounds obtained in this manner possess the property of yielding with water-soluble acid or substantive dyestuffs having sulpho groups addition products that are insoluble or difficultly soluble in water; they can therefore be used for increasing the fastness properties of dyestuffs, such as the fastness to water, to perspiration and to alkaline soap-washing of dyeings on textiles of different nature or on substrata.

As starting products for the preparation of the new compounds there may be used the aminophenyl pyridinium derivatives or their substitution products, which may contain substituents in the phenyl and/or in the pyridine radical. These compounds can be prepared by the usual reduction of mono- or polynitrophenyl pyridinium compounds.

By suitable condensation of the amines above cited with aldehydes such as formaldehyde, thioformaldehyde, acetaldehyde, benzaldehyde or with alkylol ureae, such as dimethylolureae, dimethylolthiourea, high molecular water soluble compounds will be obtained. It is well known that by treating aromatic amines such as aniline, toluidines, naphthylamines with aldehydes or with alkylol ureae, high molecular condensation products, which possess the nature of synthetic resins and which are insoluble in water, will be obtained. The new condensation products, which are obtained by the present process are insofar different from the above cited synthetic resins, as in spite of their high molecular weight they are soluble in water, a property which is due to the presence of several pyridinium groups. These water-soluble condensation products can be transformed by alkylation or peralkylation into strongly basic and very active ammonium-pyridinium compounds. Valuable and active acylated compounds possessing among other properties a soap-like character can for example be obtained by first condensing 2:4-diamino-phenyl-1-pyridinium chloride with aldehydes or alkylolureae and thereupon with the acid chlorides of high molecular fatty acids such as stearoylchloride, the chlorides of the acids of the cocoa-nut. By acylation with another organic acid chloride, such as p-toluol-sulphochloride, benzoylchloride, acetylchloride, chlor-acetylchloride, active products will also be obtained. The compounds produced as above described can thereon be peralkylated or first aralkylated and thereon peralkylated.

As alkylating and aralkylating agents, compounds such as dimethyl sulphate, methyl chloride, ethyl bromide, p-toluolsulphonic acid esters, benzylchloride can be used and the alkylation or aralkylation can be carried out in an aqueous medium at a suitable temperature, if desired under pressure and preferably in presence of acid binding agents.

The new products are more or less colored compounds, which generally can be used for increasing the fastness properties of the dyeings without being isolated from their solutions, whereby the treatment of the dyeings can be carried out in an acid, neutral or alkaline bath. In dry state they are colorless, yellow, orange to brown powders, easily soluble in water and in the case they contain several ammonium groups, they are also soluble in alkaline solutions. If solutions of dyestuffs are terated with solutions of the new products, the dyestuffs become precipitated in form of a colored lake, which is in general stable to alkali. The colored lakes obtained in this manner can be used for different industrial purposes.

The new water-soluble condensation products are characterized by the presence in their molecule of several pyridinium radicals directly linked to a carbon atom of an aminated phenyl radical. They possess therefore the grouping

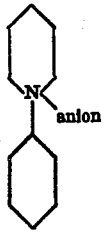

several times in the molecule, whereby the pyridinium radical is responsible for their property of solubility in water.

One object of the present invention is a process for the manufacture of new condensation products, containing a plurality of pyridinium radicals directly attached to a carbon atom of an aminated phenyl radical by treating pyridinium compounds of the general formula

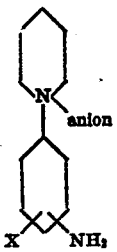

wherein X represents a hydrogen, a nitro, a halogen or an amino group and "anion" stands for halogen, sulpho, hydroxy or a radical of an organic acid, with aldehydes or alkylolureae and if desired and in any desirable order with alkylating, aralkylating or acylating agents.

Another object of the present invention are the water-soluble condensation products containing in their molecule a plurality of pyridinium groups directly attached to a carbon atom of an aminated phenyl radical, which are valuable products for increasing the fastness properties of dyestuffs having sulphonic acid groups in their molecule.

The following examples, without being limitative, illustrate the present invention:

*Example 1*

13 parts of the hydrochloride of 2:4-diaminophenylpyridinium-1-chloride of the formula

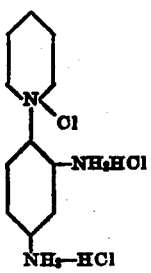

are dissolved in 30 parts of water and treated at 50° C. and under stirring with 15 parts of a formaldehyde solution of 35%. After 2½ hours the solution is neutralized and made alkaline by adding thereto 12 parts of sodium carbonate and stirred for 2½ hours at 50° C. A brownish precipitation takes place in the solution which is very easily soluble in acids. The condensation product obtained in this manner is isolated by evaporating the solution to dryness. It may be used for the purpose of increasing the fastness to perspiration of dyeings made with substantive dyestuffs.

*Example 2*

The condensation product prepared according to Example 1 is treated in a soda-alkaline solution with 60 parts of dimethylsulphate at 60–70° C., whereby the obtained ammonium base is soluble in water, even in presence of alkali. The solution thus obtained is then neutralized and can be used for the purpose of increasing the fastness properties of dyestuffs. Substantive dyeings treated with the obtained condensation product show an increased fastness to perspiration and to alkaline soap washing.

*Example 3*

26 parts of the hydrochloride of 2:4-diaminophenylpyridinium-1-chloride are dissolved in 60 parts of water and treated during 2 hours at 50° C. with 10 parts of a formaldehyde solution of 35%. The obtained solution is then neutralized and 64 parts of stearoylchloride are slowly added thereto at 40–50° C. simultaneously with a solution of 12 parts of sodium carbonate in 50 parts of water. The reaction mixture is then stirred during one hour, whereby stearoylchloride reacts completely. When this is the case, the obtained condensation product is peralkylated by adding to the solution 63 parts of dimethylsulphate and 60 parts of sodium carbonate dissolved in 100 parts of water, and the temperature is raised up to 80° C. After the peralkylation has taken place, the solution is acidulated, cooled down and filtered from somewhat stearic acid. After evaporation of the solution a brownish hygroscopic product will be obtained.

By using this product for the treatment of substantive dyeings, their fastness to perspiration and washing will be greatly increased.

By using in this example instead of the stearoylchloride an equal quantity of p-toluolsulphochloride, a similar product will be obtained.

*Example 4*

65 parts of 2:4-diaminophenylpyridinium-1-chloride dissolved in 150 parts of water are treated during 12 hours at 50° C. with 27 parts of benzaldehyde. The brown solution thus obtained has a strong precipitating power for substantive dyestuffs.

By treating the condensation product thus obtained with 100 parts of dimethylsulphate in presence of an excess of sodium carbonate at 50–60° C., a condensation product will be obtained, which is easily soluble in acids and possesses increased precipitating properties.

*Example 5*

13 parts of the hydrochloride of 2:4-diaminophenylpyridinium-1-chloride are dissolved in 25 parts of water, neutralized and treated at 0–5° C. with 6 parts of symmetrical dimethylolurea of the formula

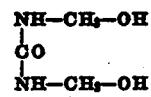

dissolved in 10 parts of water. The reaction mixture is stirred during 2 hours, whereby the temperature is allowed to increase up to 20° C. The solution is then acidulated and heated until the precipitate becomes dissolved. A yellowish brown solution, useful for the increase of the fastness properties of dyeings will thus be obtained.

*Example 6*

By replacing in Example 5 the dimethylolurea by a respective quantity of dimethylolthiourea, a product will be obtained which is especially suitable for increasing the fastness properties of substantive dyeings to perspiration and to alkaline washing.

*Example 7*

The condensation product obtained according to Example 1 is treated at 70° C. and in presence of an excess of sodium carbonate with 22 parts of p-toluenesulphochloride. The dark brown precipitation which takes place at the beginning of the reaction becomes completely dissolved after stirring for some hours. By evaporating the solution, a brownish powder will be obtained which possesses similar properties to the above described products.

By using instead of p-toluenesulphochloride a respective quantity of chloracetylchloride and subsequent condensation of the acylated compound thus obtained with an aromatic or a heterocyclic base, a product will be obtained which possesses strong precipitating properties for substantive dyestuffs.

Instead of the 2:4-diaminophenylpyridiniumchloride used above, one can use the respective amino-derivatives or their substitution products.

*Example 8*

30 parts of the hydrochloride of 2:4-diaminophenylpyridinium-1-chloride are dissolved in 30 parts of a 4% aqueous sodium carbonate solution and 4.5 parts of acetaldehyde of 80% are added thereto within half an hour at 50-60° C. The solution is then stirred during 48 hours at 50-60° C. and evaporated to dryness on a water bath. The reddish-brown condensation product obtained in this manner is suitable for increasing the fastness to perspiration of substantive dyeings.

*Example 9*

13 parts of the hydrochloride of 2:4-diaminophenylpyridinium-1-chloride are dissolved in 20 parts of concentrated sulphuric acid and 3.5 parts of p-formaldehyde are added thereto. After heating for 1 hour at 100-120° C. the reaction mass is alowed to cool down and is diluted with 200 parts of water. After neutralization at the boil with 20 parts of calcium carbonate, the filtered solution is evaporated in vacuo to dryness. The obtained product is suitable for the increase of the fastness properties of direct dyestuffs.

*Example 10*

6.5 parts of 2:4:6-triaminophenyl-4'-chloropyridiniumchloride of the formula

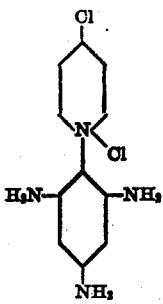

are dissolved in 35 parts of a 10% aqueous solution of hydrochloric acid, heated up to 50-60° C. and treated with 8 parts of a formaldehyde solution of 35%. The solution is heated during 24 hours at 50-60° C. and evaporated to dryness, preferably in vacuo.

The obtained condensation product increases the fastness to washing and to perspiration of dyeings made with substantive dyestuffs.

*Example 11*

6 parts of 2:4-diaminophenyl-4'-aminopyridiniumchloride of the formula

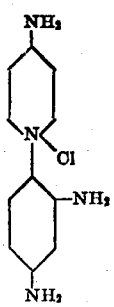

are dissolved in 200 parts of a 2% hydrochloric acid solution, treated with 7.5 parts of a formaldehyde solution of 35% and heated so long at 70-80° C., until the cloudy solution becomes completely clear. The condensation product thus obtained is isolated by evaporating the solution in vacuo and can be used for increasing the fastness to perspiration of direct dyestuffs.

*Example 12*

13 parts of the hydrochloride of 2:4-diaminophenylpyridiniumchloride are dissolved in 50 parts of water, 5 parts of furfurol are added thereto and the solution is heated at a reflux condenser during 4 hours. The initial cherry-red solution becomes during this heating more and more brown. After evaporating to dryness, the obtained product can be used for the increase of the fastness properties of substantive dyestuffs to perspiration and to washing.

*Example 13*

13 parts of the hydrochloride of 2:4-diaminophenylpyridiniumchloride are dissolved in 30 parts of concentrated sulphuric acid, 5.5 parts of trithioformaldehyde are added thereto and the reaction mass is heated during 1 hour at 120-150° C. After cooling down the reaction mass is poured into 200 parts of water, neutralized with about 30 parts of calcium carbonate and the solution obtained after filtration evaporated to dryness in vacuo. The product thus obtained can be used for increasing the fastness properties of direct dyestuffs, especially the fastness to alkaline soap washing and to perspiration.

What we claim is:

1. A process for the manufacture of new condensation products, comprising treating pyridinium compounds of the general formula

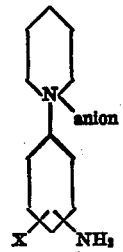

wherein X stands for a substituent selected from the group consisting of hydrogen, nitro, halogen and amino and "anion" represents a radical of an acid of the inorganic and organic series, with a polymerizing compound selected from the class consisting of aldehydes and methylolureae.

2. A process for the manufacture of new condensation products, comprising treating pyridinium compounds of the general formula

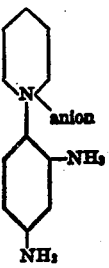

wherein "anion" represents a radical of an acid of the inorganic and organic series, with a polymerizing compound selected from the class consisting of aldehydes and methylolureae.

3. A process for the manufacture of new condensation products, comprising treating pryridinium compounds of the general formula

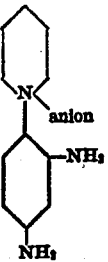

wherein "anion" represents a radical of an acid of the inorganic and organic series, with a polymerizing compound selected from the class consisting of aldehydes and methylolureae in an aqueous medium and subjecting the compounds thus obtained to a treatment with a compound selected from the group consisting of alkylating, aralkylating and acylating agents.

4. A process for the manufacture of a new condensation product, comprising treating 2:4-diaminophenyl-1-pyridinium chloride in an aqueous medium with formaldehyde.

5. A process for the manufacture of a new condensation product, comprising treating 2:4-diaminophenyl-1-pyridinium chloride in sulphuric acid with paraformaldehyde.

6. A process for the manufacture of a new condensation product, comprising treating 2:4-diaminophenyl-1-pyridinium chloride in sulphuric acid with thioformaldehyde.

7. The new condensation products containing a plurality of aminated radicals of the formula

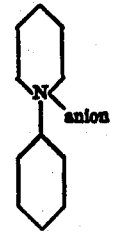

wherein "anion" represents a radical of an acid of the inorganic and organic series, linked together by groups selected from the group consisting of —CH$_2$— and —CH$_2$NHCO—NH—CH$_2$— groups, said products being in the dry state colorless to yellow to brown powders, easily soluble in water, and yielding with sulphonated dyestuffs addition products difficultly soluble in water.

8. The new condensation product containing a plurality of aminated radicals of the formula

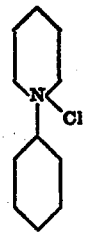

linked together by —CH$_2$— groups, which is in the dry state a yellowish powder easily soluble in water, and which yields with sulphonated dyestuffs addition products difficultly soluble in water.

VALENTIN KARTASCHOFF.
WILLY STEINEMANN.